(12) United States Patent
Rothmund et al.

(10) Patent No.: US 11,312,376 B2
(45) Date of Patent: Apr. 26, 2022

(54) DEVICE FOR LATERAL GUIDANCE ASSISTANCE FOR A ROAD VEHICLE

(71) Applicant: Bayerische Motoren Werke Aktiengesellschaft, Munich (DE)

(72) Inventors: Tobias Rothmund, Oberschleissheim (DE); Tom Kasseckert, Mering (DE); Matthias Beck, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/110,427

(22) Filed: Aug. 23, 2018

(65) Prior Publication Data
US 2018/0362038 A1   Dec. 20, 2018

Related U.S. Application Data

(63) Continuation of application No. PCT/EP2017/053710, filed on Feb. 17, 2017.

(30) Foreign Application Priority Data

Feb. 24, 2016   (DE) .................... 10 2016 202 829.4

(51) Int. Cl.
*A01B 69/00* (2006.01)
*B62D 6/00* (2006.01)
(Continued)

(52) U.S. Cl.
CPC ............ *B60W 30/12* (2013.01); *B60W 50/14* (2013.01); *B60W 2420/42* (2013.01)

(58) Field of Classification Search
CPC .. B60W 30/12; B60W 50/14; B60W 2420/42; B60W 40/06
(Continued)

(56) References Cited

U.S. PATENT DOCUMENTS 6,388,565 B1   5/2002   Bernhard et al.
9,132,837 B2   9/2015   Schlensag et al.
(Continued)

FOREIGN PATENT DOCUMENTS

CN   101132965 A   2/2008
CN   102460535 A   5/2012
(Continued)

OTHER PUBLICATIONS

English Translation for DE102006012997A1.*
(Continued)

*Primary Examiner* — Mahmoud S Ismail
(74) *Attorney, Agent, or Firm* — Crowell & Moring LLP

(57) ABSTRACT

A device for lateral guidance assistance for a vehicle includes a programmable electronic control unit and a plurality of distance sensors configured to capture obstacles to a side of and/or behind the vehicle within one or more defined warning regions. The device also includes an optical sensor device configured to capture a lane width of a current lane and/or a lane width of a neighboring lane. The programmable electronic control unit is configured such that at least one of the defined warning regions is defined in a temporally and/or spatially variable manner based on the lane width of the current lane and/or the neighboring lane.

15 Claims, 2 Drawing Sheets

(51) Int. Cl.

| | | |
|---|---|---|
| *B62D 11/00* | (2006.01) | |
| *B62D 12/00* | (2006.01) | |
| *B63G 8/20* | (2006.01) | |
| *B63H 25/04* | (2006.01) | |
| *G05D 1/00* | (2006.01) | |
| *G06F 7/00* | (2006.01) | |
| *G06F 17/00* | (2019.01) | |
| *B60W 30/12* | (2020.01) | |
| *B60W 50/14* | (2020.01) | |
| *G05D 3/00* | (2006.01) | |
| *G06G 7/70* | (2006.01) | |
| *G06F 7/76* | (2006.01) | |
| *G08G 1/00* | (2006.01) | |

(58) Field of Classification Search
USPC .............................................. 701/41, 1, 116
See application file for complete search history.

(56) References Cited

U.S. PATENT DOCUMENTS

| | | | |
|---|---|---|---|
| 2006/0070787 A1* | 4/2006 | Bartels .................. | G01S 13/931 180/271 |
| 2006/0206243 A1* | 9/2006 | Pawlicki ............ | G06K 9/00791 701/1 |
| 2012/0029813 A1 | 2/2012 | Tajima et al. | |
| 2013/0181860 A1 | 7/2013 | Le et al. | |
| 2014/0136015 A1* | 5/2014 | Hayakawa .......... | B60T 8/17557 701/1 |
| 2014/0324325 A1* | 10/2014 | Schlensag ....... | B60W 30/18163 701/116 |
| 2015/0192666 A1* | 7/2015 | Watanabe ............. | G01S 13/931 342/27 |
| 2017/0174262 A1* | 6/2017 | Kobayashi .............. | G01S 19/14 |

FOREIGN PATENT DOCUMENTS

| | | | | |
|---|---|---|---|---|
| DE | 10 2006 012 997 A1 | | 9/2007 | |
| DE | 102006012997 A1 | * | 9/2007 | .......... B62D 15/025 |
| DE | 10 2006 048 503 A1 | | 4/2008 | |
| DE | 10 2007 007 540 A1 | | 8/2008 | |
| DE | 10 2007 015 879 A1 | | 10/2008 | |
| DE | 10 2007 027 494 A1 | | 1/2009 | |
| DE | 10 2011 080 928 A1 | | 2/2013 | |
| DE | 10 2012 204 948 A1 | | 10/2013 | |
| DE | 10 2013 104 256 A1 | | 10/2014 | |
| DE | 10 2013 019 112 A1 | | 5/2015 | |
| EP | 1 052 143 A2 | | 11/2000 | |
| EP | 2 899 083 A2 | | 7/2015 | |
| WO | WO 03/091813 A1 | | 11/2003 | |
| WO | WO 2006/092431 A1 | | 9/2006 | |
| WO | WO 2012/103970 A1 | | 8/2012 | |

OTHER PUBLICATIONS

IP.com Search—Feb. 17, 2021 (Year: 2021).*
PCT/EP2017/053710, International Search Report dated May 30, 2017 (Three (3) pages).
German Search Report issued in German counterpart application No. 10 2016 202 829.4 dated Dec. 8, 2016, (Seven (7) pages).
Chinese Office Action issued in Chinese application No. 201780012233.5 dated Aug. 28, 2020, with English translation (Fourteen (14) pages).

* cited by examiner

DEVICE FOR LATERAL GUIDANCE ASSISTANCE FOR A ROAD VEHICLE

CROSS REFERENCE TO RELATED APPLICATIONS

This application is a continuation of PCT International Application No. PCT/EP2017/053710, filed Feb. 17, 2017, which claims priority under 35 U.S.C. § 119 from German Patent Application No. 10 2016 202 829.4, filed Feb. 24, 2016, the entire disclosures of which are herein expressly incorporated by reference.

BACKGROUND AND SUMMARY OF THE INVENTION

The invention relates to a device for lateral guidance assistance for a road vehicle.

Known lateral guidance driver assistance systems provide the vehicle driver with assistance, for example during a lane change, in order to reduce the risk of a possible collision, in particular with third-party vehicles in the blind spot. Known lane keeping assistance systems generally presuppose existing road markings and minimum lane widths in order to be able to operate reliably. In environmental conditions, as are present during highway roadworks for example, in which the lane is very narrow and a minimum width of the lane is not guaranteed for a lane keeping system and in which lane markings are sometimes not present at all or are present in multiple forms, known lane keeping systems generally reach their limit.

Known lane keeping assistance or lane departure warning systems always presuppose existing lane boundaries to be captured by the system, wherein a warning signal is generated if it is detected that the lane marking has been crossed, which warning signal is used to draw the driver's attention to the given situation.

DE 10 2006 048 503 A1 mentions, for example, a device for the lane guidance of a vehicle, which device distinguishes between temporary and permanent lane markings, wherein, if temporary lane markings are detected, they are preferably used for the lane guidance. The distinction between temporary and permanent lane markings is generally carried out by means of a color distinction. Said document also mentions a device for determining a possibility of driving through, in which a sensor device is used to capture the distance between obstacles in the direction of travel, the captured distance is compared with the stored vehicle width and/or vehicle height and, on the basis of this comparison, a warning signal is generated if the captured distance does not allow the vehicle to drive through. A purely reactive behavior of the vehicle driver is intended to be largely avoided, in particular, by means of the lateral guidance assistance according to the subject matter of DE 10 2006 048 503 A1.

With respect to the further technical background in connection with an estimation of the number of lanes, reference is made to DE 10 2013 104 256 A1.

The invention is based on the object of providing a device for lateral guidance assistance for a road vehicle, which device avoids false warnings, in particular.

The invention fundamentally relates to a device and a method for lateral guidance assistance for a road vehicle, wherein at least one warning region is defined in a temporally and/or spatially variable manner, using a programmable electronic control unit, using distance sensors for capturing obstacles to the side of and/or behind the vehicle within a defined warning region and using an optical sensor device for capturing the lane width of the current lane and/or for capturing the lane width at least of the nearest neighboring lane, on the basis of the captured lane width of the current lane and/or on the basis of the captured lane width at least of the nearest neighboring lane.

The invention is based on the following concepts:

In known systems, in particular for lane change warning or blind spot warning, a warning region in which a lane change warning is triggered is defined as the region permanently associated with the vehicle position. In this case, both a warning region on the driver's side and a warning region on the passenger side may be predefined. In other words, warning regions are fixed geometrical regions in the vehicle coordinate system. Occasionally, there are country-dependent variants for these warning regions. Various methods for detecting and/or measuring road markings are available.

A permanently defined warning region according to the prior art can therefore result in incorrect warnings in isolated situations. According to the prior art, different conditions of vehicle lanes are not taken into account. For example, the differences in lane widths (for example in roadworks, in an urban or highway situation or in the case of country-specific lane widths) and a corresponding variation in permissible lateral distances between the vehicles are not taken into account. The management of country variants requires a large amount of application effort.

The invention is therefore based on the idea of adaptively defining at least one warning region on the basis of the actual width of the lanes:

In this case, in the driver assistance system according to the invention having adaptive warning regions, at least one warning region can be defined on the basis of an actual lane width of at least one neighboring lane.

In this case, the warning regions can be defined in a temporally and spatially variable manner. This provides a decisive advantage in comparison with fixed coupling of these regions to the vehicle coordinate system. In this case, at least one lane can be detected and/or measured using at least one environment-detecting optical sensor of the vehicle. At least one front camera system, at least one rear camera system, at least one camera system as a replacement for or as an addition to a mirror system and/or at least one laser sensor of the vehicle can be used, for example, as environment-detecting optical sensors.

In this case, a lane can be detected and measured on the basis of the lane markings and/or lane borders, for example guardrails, which are detected using sensors and bound said lane. For example, a camera system captures the left-hand and right-hand road markings of the current lane of the vehicle equipped with the device according to the invention and the respective left-hand and right-hand markings of the neighboring lane if present. The warning regions can be accordingly adapted on the basis of the road width.

Additionally or alternatively, at least one warning region can be effected for a neighboring lane at least on the basis of the lane width of the current lane. In this case, the driver assistance system measures the current lane and determines, for example by means of sensors and/or by means of a navigation system, whether there is fundamentally a neighboring lane. The driver assistance system can then determine a virtual warning region width of the neighboring lane on the basis of the current lane.

The device according to the invention can also be configured in such a manner that a warning region width is adapted on the basis of the lane width of a predefined lane marking in roadworks. This can be particularly preferably detected by means of the typical special coloration. In this case, the line of the roadworks can be given priority over the normal line (for example marking or guardrail).

The at least one warning region width can also be adapted according to the invention on the basis of a classification of the road type by means of navigation data or back-end data. On the basis of the road type, for example highway, freeway or urban road, it is possible to assume a road width which is conventional for the corresponding road type and to which the warning region can be adapted.

According to the invention, the at least one warning region width can fundamentally be determined on the basis of navigation data or back-end data relating to the environment of the vehicle, in particular if the lane width of the current lane and the lane width of the neighboring lane cannot be detected using sensors. Defined special situations, in particular, can be hereby detected. A fixed value of the warning region adaptation can be assigned to each defined special situation if necessary.

However, the adaptation of the warning region cannot only relate to the warning region width but additionally or alternatively also to the lateral distance between the warning region and the vehicle.

This lateral positioning of a warning region can also be determined on the basis of the lateral position of the vehicle in the current lane. The lateral offset forms the position of the vehicle in the current lane irrespective of the coordinate system used.

The lateral displacement of a warning region can also be determined on the basis of the position of the detected lanes of the neighboring lane with respect to the vehicle.

Furthermore, the invention also comprises, in particular, an electronic control unit which can be used to carry out a corresponding method necessary for the invention and which contains a computer program product for carrying out the method. This control unit can be integrated in an electronic control device which is present anyway for driver assistance systems for lateral guidance assistance.

Advantages of the Invention

Customer-relevant improvement in the system performance;
Reduction in false and incorrect warnings as a result of adaptive warning region adaptations;
No additional outlay on the hardware and sensor system;
Country-dependent and road-dependent application and protection of the function can be omitted or substantially simplified.

Other objects, advantages and novel features of the present invention will become apparent from the following detailed description of one or more preferred embodiments when considered in conjunction with the accompanying drawings.

BRIEF DESCRIPTION OF THE DRAWINGS

One exemplary embodiment of the invention is illustrated in the drawing and is described in more detail below. In the drawing.

DETAILED DESCRIPTION OF THE DRAWINGS

Figure 2:
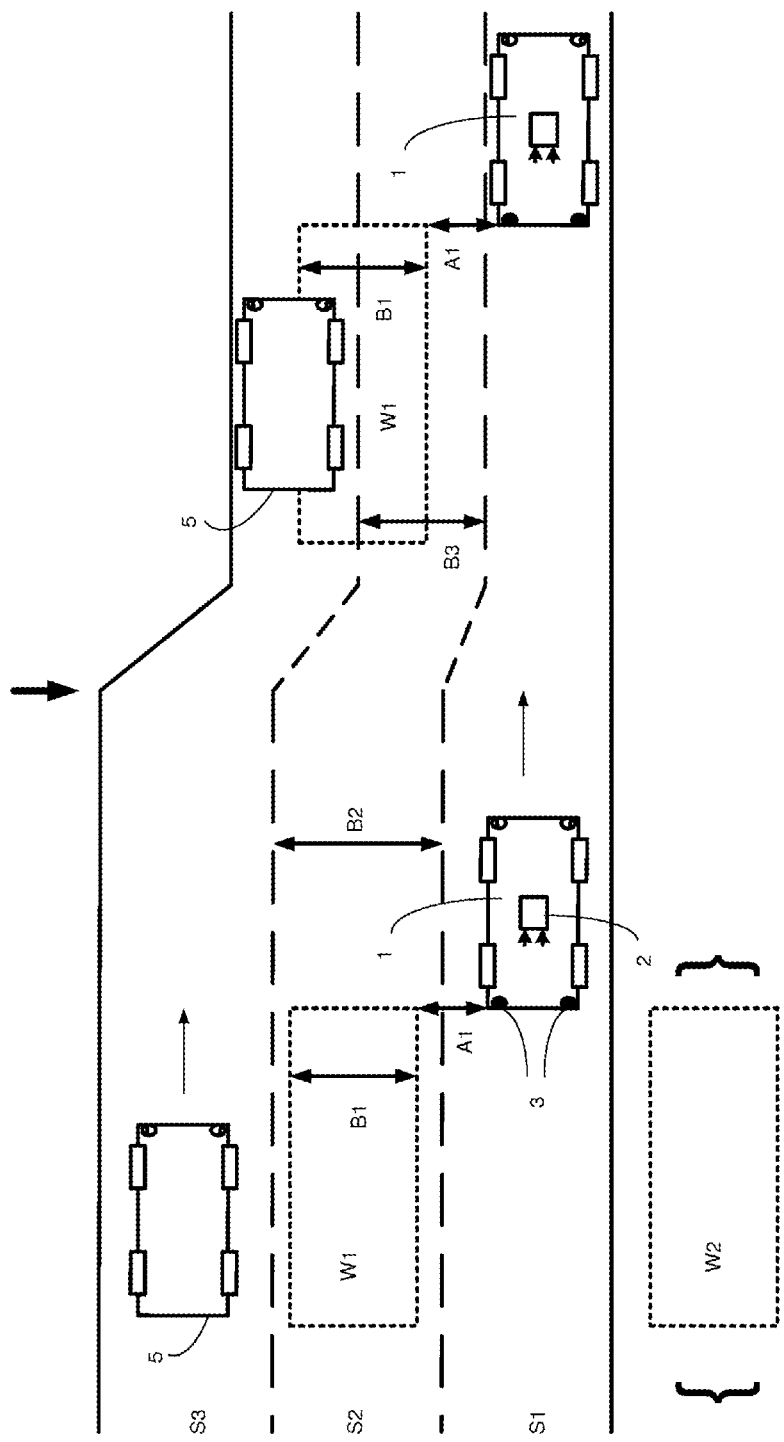
FIG. 2: shows, in comparison with FIG. 1, an exemplary embodiment which is known nowadays.

The prior art and the problem associated therewith are first of all explained in connection with FIG. 2:

FIG. 2 illustrates a road vehicle 1 according to the prior art having a programmable electronic control unit 2 and having distance sensors 3 for capturing obstacles to the side of and/or behind the vehicle 1 within a defined warning region W1 on the driver's side and within a defined warning region W2 on the passenger side. In the example illustrated, the three lanes S1, S2 and S3 of a road have a transition (vertical arrow) from a comparatively large width to a comparatively narrow width in the direction of travel from left to right. For example, the width B2 of the nearest neighboring lane S2 of the vehicle 1 according to the invention is reduced to a width B3. The width B1 of the warning region W1 and the lateral distance A1 between the warning region W1 and the vehicle 1, that is to say the lateral position, remain the same. As a result, a third-party vehicle 5 in the next lane but one S3 approaching from the rear would be incorrectly detected as an obstacle to be warned of in the region of the narrower lane guidance. The invention is intended to prevent such an incorrect warning.

Figure 1:
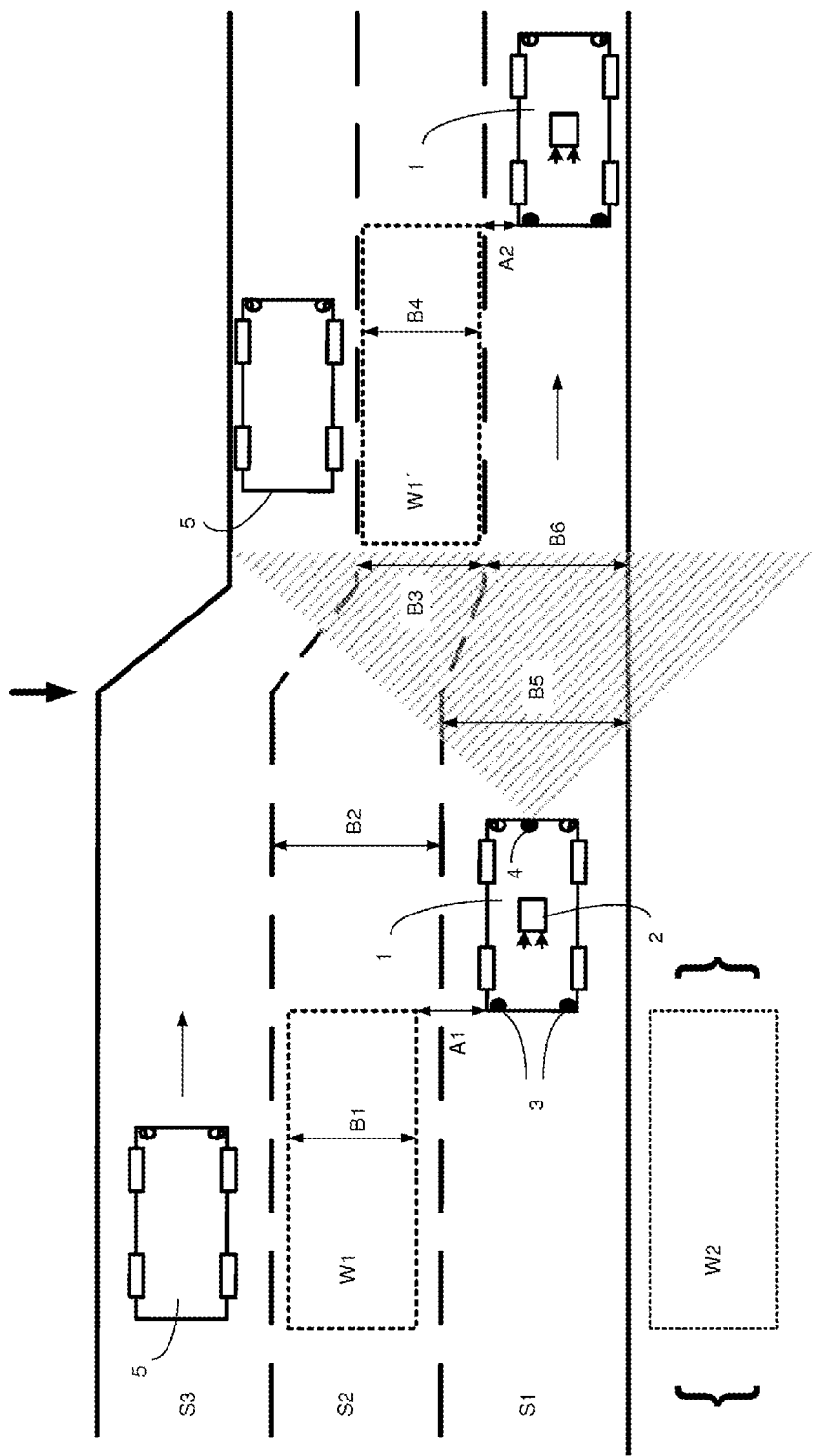
FIG. 1: shows a schematic illustration of an exemplary traffic situation with two motor vehicles which are spaced apart from one another in the direction of travel and are traveling in a laterally offset manner with respect to one another, wherein the vehicle traveling in front is equipped with the device according to the invention for lateral guidance assistance for the purpose of explaining the invention.

The invention is explained by way of example below only in connection with the warning region W1. In FIG. 1, the vehicle 1 also has a front-facing optical sensor device 4 for capturing the respective lane width B5 and B6 of the current lane S1 and for capturing the respective lane width B2 or B3 at least of the nearest neighboring lane S2. The control unit 2 is, for example, configured according to the invention in the form of an accordingly programmed functional module (computer program product) in such a manner that the warning region W1 can be defined in a temporally and/or spatially variable manner on the basis of the captured lane width B5 or B6 of the current lane S1 and/or on the basis of the captured lane width B2 or B3 at least of the nearest neighboring lane S2.

For example, in the present exemplary embodiment, the warning region W1 is changed as follows in a first alternative with respect to its width and with respect to its distance to the vehicle 1:

If a width B2 is captured in the nearest neighboring lane S2, the width of the warning region W1 is defined as a width B1 and the distance between the warning region W1 and the vehicle 1 is preferably also defined as a distance A1. If a width B3 is captured in the nearest neighboring lane S2, the width of the warning region W1 is defined as a width B4 and the distance between the warning region W1 and the vehicle 1 is preferably also defined as a distance A2. This variable definition takes place, in terms of time, if the transition from wide lanes to comparatively narrow lanes is detected, for example, and preferably after a (new) width B3 which remains the same again has been detected for a predefined time.

In particular, if the lane width at least of the nearest neighboring lane S2 cannot be captured by means of discernible boundaries (for example in the case of a missing lane marking and guardrail), the warning region is preferably changed as above in a second alternative, but with the difference that the widths B2 and B3 of the neighboring lane S1 are inferred from the respectively detected widths B5 and B6 of the current lane S1.

In particular, if lane widths B2, B3, B5 and B6 are missing or can be poorly evaluated, further environmental parameters are preferably captured for the purpose of identifying defined special situations (for example roadworks, bottleneck, changed course of the road without markings, color change of the markings, road type change etc.) (for example by means of the optical sensors 4 and/or by evaluating navigation data), wherein predefined special lane widths are defined according to the respectively identified special situation (not specifically illustrated here).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for lateral guidance assistance for a vehicle, the device comprising:
    a plurality of distance sensors that detect obstacles within one or more defined warning regions to a side of and/or behind the vehicle, wherein the warning regions are laterally spaced a corresponding distance from the vehicle;
    an optical sensor device that detects a lane width of a current lane and/or a lane width of a neighboring lane; and
    a programmable electronic control unit configured to:
        define at least one of the one or more warning regions in a temporally and/or spatially variable manner based on the detected lane width of the current lane and/or the neighboring lane, wherein the at least one of the defined warning regions is variably defined based on the corresponding distance to the vehicle, and
        initiate a warning in response to the optical sensor device detecting obstacles within the one or more warning regions.

2. The device as claimed in claim 1, wherein the at least one of the defined warning regions is variably defined based on a corresponding width.

3. The device as claimed in claim 1, wherein the at least one of the defined warning regions is defined based on the lane width of the current lane if the lane width of the neighboring lane cannot be captured using discernible boundaries.

4. The device as claimed in claim 2, wherein the at least one of the defined warning regions is defined based on the lane width of the current lane if the lane width of the neighboring lane cannot be captured using discernible boundaries.

5. The device as claimed in claim 1, wherein the programmable electronic control unit is further configured to capture environmental parameters for identifying defined special situations, wherein predefined special lane widths are defined according to a respectively identified special situation if neither the lane width of the current lane nor the lane width of the neighboring lane can be captured.

6. The device as claimed in claim 2, wherein the programmable electronic control unit is further configured to capture environmental parameters for identifying defined special situations, wherein predefined special lane widths are defined according to a respectively identified special situation if neither the lane width of the current lane nor the lane width of the neighboring lane can be captured.

7. The device as claimed in claim 3, wherein the programmable electronic control unit is further configured to capture environmental parameters for identifying defined special situations, wherein predefined special lane widths are defined according to a respectively identified special situation if neither the lane width of the current lane nor the lane width of the neighboring lane can be captured.

8. A method for lateral guidance assistance for a vehicle comprising:
    detecting, by a plurality of distance sensors, obstacles within one or more defined warning regions to a side of and/or behind the vehicle, wherein the warning regions are laterally spaced a corresponding distance from the vehicle;
    detecting, by an optical sensor device, a lane width of a current lane and/or a lane width of a neighboring lane;
    defining, by a programmable electronic control unit, at least one of the defined warning regions in a temporally and/or spatially variable manner based on the detected lane width of the current lane and/or the neighboring lane, wherein the at least one of the defined warning regions is variably defined based on the corresponding distance to the vehicle; and
    initiating a warning in response to the optical sensor device detecting obstacles within the one or more defined warning regions.

9. The method as claimed in claim 8, wherein the at least one of the defined warning regions is variably defined based on a corresponding width.

10. The method as claimed in claim 8, wherein the at least one of the defined warning regions is defined based on the lane width of the current lane if the lane width of the neighboring lane cannot be captured using discernible boundaries.

11. The method as claimed in claim 9, wherein the at least one of the defined warning regions is defined based on the lane width of the current lane if the lane width of the neighboring lane cannot be captured using discernible boundaries.

12. The method as claimed in claim 8, further comprising capturing, by the programmable electronic control unit, environmental parameters for identifying defined special situations, wherein predefined special lane widths are defined according to a respectively identified special situation if neither the lane width of the current lane nor the lane width of the neighboring lane can be captured.

13. The method as claimed in claim 9, further comprising capturing, by the programmable electronic control unit, environmental parameters for identifying defined special situations, wherein predefined special lane widths are defined according to a respectively identified special situation if neither the lane width of the current lane nor the lane width of the neighboring lane can be captured.

14. The method as claimed in claim 10, further comprising capturing, by the programmable electronic control unit, environmental parameters for identifying defined special situations, wherein predefined special lane widths are defined according to a respectively identified special situation if neither the lane width of the current lane nor the lane width of the neighboring lane can be captured.

15. A motor vehicle having a device configured to provide lateral guidance assistance for a vehicle, the device comprising:
    a plurality of distance sensors that detect obstacles within one or more defined warning regions to a side of and/or behind the vehicle, wherein the warning regions are laterally spaced a corresponding distance from the vehicle;

an optical sensor device that detects a lane width of a current lane and/or a lane width of a neighboring lane; and a programmable electronic control unit configured to:
define at least one of the one or more warning regions in a temporally and/or spatially variable manner based on the detected lane width of the current lane and/or the neighboring lane, wherein the at least one of the defined warning regions is variably defined based on the corresponding distance to the vehicle, and initiate a warning to a driver of the vehicle in response to the optical sensor device detecting obstacles within the one or more warning regions.

* * * * *